(12) United States Patent
Ervin et al.

(10) Patent No.: US 9,695,822 B2
(45) Date of Patent: *Jul. 4, 2017

(54) ADJUSTABLE CORE TURBOCHARGER

(71) Applicant: Ford Global Technologies, LLC, Dearborn, MI (US)

(72) Inventors: James Douglas Ervin, Novi, MI (US); August Thomas Vaught, Harper Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

This patent is subject to a terminal disclaimer.

(21) Appl. No.: 14/489,300

(22) Filed: Sep. 17, 2014

(65) Prior Publication Data
US 2015/0004038 A1    Jan. 1, 2015

Related U.S. Application Data

(63) Continuation of application No. 13/333,189, filed on Dec. 21, 2011, now Pat. No. 8,840,365.

(51) Int. Cl.
| | | |
|---|---|---|
| *F01D 7/00* | (2006.01) | |
| *F04C 28/18* | (2006.01) | |
| *F01D 11/08* | (2006.01) | |
| *F04D 15/00* | (2006.01) | |
| *F04D 27/00* | (2006.01) | |
| *F01D 11/22* | (2006.01) | |
| *F04D 25/04* | (2006.01) | |
| *F04D 25/02* | (2006.01) | |

(Continued)

(52) U.S. Cl.
CPC ............ *F04C 28/185* (2013.01); *F01D 11/08* (2013.01); *F01D 11/22* (2013.01); *F01D 17/141* (2013.01); *F01D 17/143* (2013.01); *F01D 25/24* (2013.01); *F02B 37/025* (2013.01); *F02B 37/22* (2013.01); *F02B 39/14* (2013.01); *F02B 47/08* (2013.01); *F04C 18/02* (2013.01); *F04D 15/0033* (2013.01); *F04D 25/024* (2013.01); *F04D 25/045* (2013.01); *F04D 27/002* (2013.01); *F05D 2220/40* (2013.01); *F05D 2250/40* (2013.01); *Y02T 10/144* (2013.01)

(58) Field of Classification Search
CPC ........ F01D 17/141; F01D 11/08; F01D 11/22; F01D 25/24; F02B 37/025; F02B 37/22; F02B 37/225; F04D 15/0038; F04D 15/0033; F04D 17/10; F04D 25/045; F04D 27/002

See application file for complete search history.

(56) References Cited

U.S. PATENT DOCUMENTS 3,407,740 A    10/1968  Samerdyke
4,418,537 A    12/1983  Iwamoto et al.
(Continued)

*Primary Examiner* — Ninh H Nguyen
(74) *Attorney, Agent, or Firm* — Julia Voutyras; McCoy Russell LLP

(57) ABSTRACT

A turbocharger is provided herein. The turbocharger includes a housing and an adjustable core at least partially circumferentially surrounded by the housing, the adjustable core having a turbine rotor coupled to a compressor rotor via a shaft. The turbocharger further includes an adjustment mechanism coupled to the adjustable core configured to adjust an axial position of the housing relative to the adjustable core in response to adjustment commands.

18 Claims, 8 Drawing Sheets

(51) Int. Cl.
*F01D 17/14* (2006.01)
*F01D 25/24* (2006.01)
*F02B 37/02* (2006.01)
*F02B 37/22* (2006.01)
*F02B 39/14* (2006.01)
*F02B 47/08* (2006.01)
*F04C 18/02* (2006.01)

(56) References Cited

U.S. PATENT DOCUMENTS

| | | | |
|---|---|---|---|
| 4,822,242 A | | 4/1989 | Yamazaki |
| 5,025,629 A | * | 6/1991 | Woollenweber ...... F01D 17/141 |
| | | | 415/160 |
| 5,263,816 A | * | 11/1993 | Weimer ................ F01D 11/22 |
| | | | 415/131 |
| 5,267,829 A | | 12/1993 | Schmidt et al. |
| 5,855,117 A | | 1/1999 | Sumser et al. |
| 6,273,671 B1 | | 8/2001 | Ress, Jr. |
| 6,443,696 B1 | | 9/2002 | Erdmann et al. |
| 6,553,762 B2 | * | 4/2003 | Loffler .................. F01D 9/026 |
| | | | 415/203 |
| 7,047,739 B2 | | 5/2006 | Fledersbacher et al. |
| 7,048,503 B2 | | 5/2006 | Döring et al. |
| 7,186,076 B2 | | 3/2007 | Döring et al. |
| 7,350,356 B2 | | 4/2008 | Sumser et al. |
| 7,540,149 B2 | * | 6/2009 | Sumser ................ F02B 37/025 |
| | | | 415/158 |
| 7,946,116 B2 | | 5/2011 | Sausse et al. |
| 8,840,365 B2 | * | 9/2014 | Ervin .................... F04D 25/024 |
| | | | 415/131 |
| 2010/0077748 A1 | | 4/2010 | Akita |
| 2010/0229551 A1 | | 9/2010 | Wu et al. |
| 2011/0099998 A1 | | 5/2011 | Serres et al. |

* cited by examiner

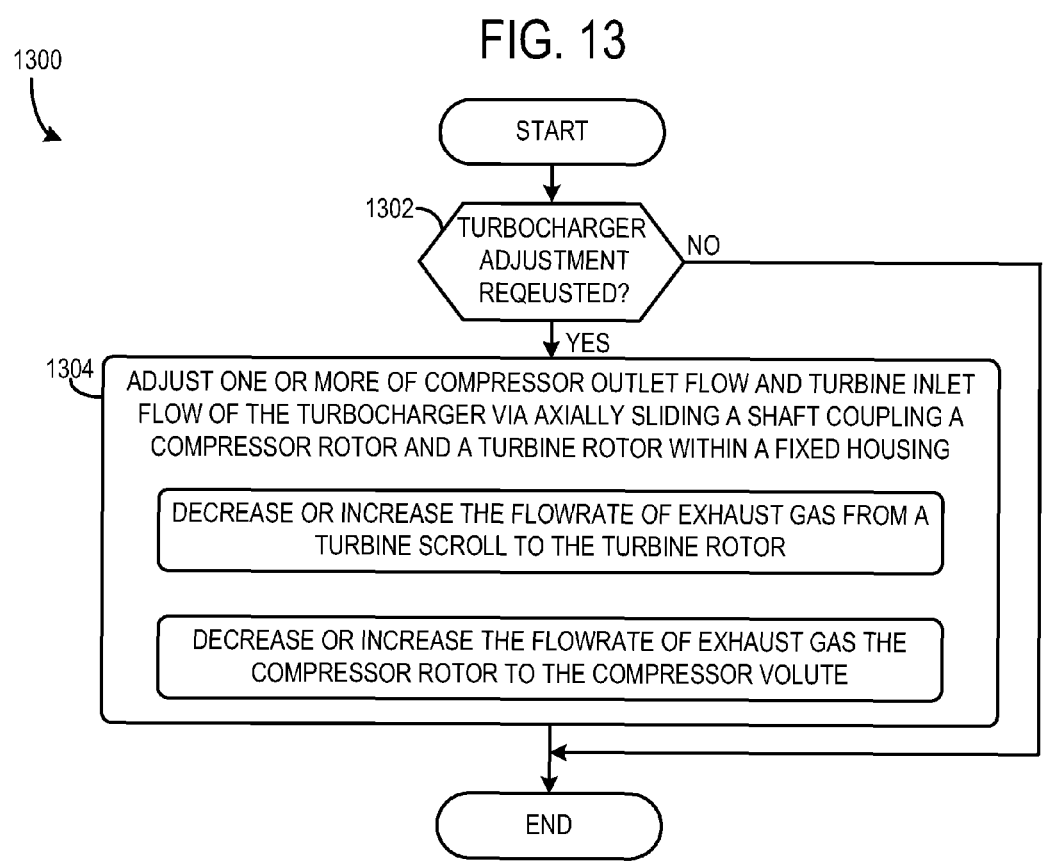

ADJUSTABLE CORE TURBOCHARGER

CROSS REFERENCE TO RELATED APPLICATIONS

The present application claims priority to U.S. patent application Ser. No. 13/333,189, "ADJUSTABLE CORE TURBOCHARGER," filed on Dec. 21, 2011, the entire contents of which are hereby incorporated by reference for all purposes.

BACKGROUND/SUMMARY

Turbochargers are incorporated into engines to increase the engine's power to weight ratio. It may be desirable to adjust the flowpath of the exhaust gas into the turbine to facilitate adjustment of the turbine's characteristics based on the engine operating conditions. For example, twin scroll turbines have been developed to achieve adjustment of the turbine's characteristics. A twin scroll turbine may include two scrolls for delivering exhaust gas to the turbine rotor and a valve configured to adjust the flow-rate of the exhaust gas through the scrolls. The geometry of each of the scrolls may be designed to decreases loses over a variety of engine operating conditions. For example, the first scroll may be sharply angled for a quicker response during lower engine speeds and a second scroll may be less angled to decrease losses during higher engine speeds.

In some twin scroll turbines, an adjustment mechanism may be provided in the turbine housing which enable adjustment of the exhaust gas flowrate through each of the scrolls. U.S. Pat. No. 5,855,117 discloses a turbine housing having two inlet flow passages and an adjustment apparatus integrated into the housing configured to adjust the flowrate from both of the inlet flow passages to the turbine rotor. The Inventors have recognized several drawbacks with this type of design. Various components in the adjustment mechanism, such as the axial slide member, may be prone to thermal degradation due to the high temperatures experienced in the inlets. Moreover, the tolerance required for the axial slide member may not be achievable within cost targets. Consequently, the losses in the turbine may be increased.

As such in one approach, a turbocharger is provided. The turbocharger includes a housing and an adjustable core at least partially circumferentially surrounded by the housing, the adjustable core having a turbine rotor coupled to a compressor rotor via a shaft. The turbocharger further includes an adjustment mechanism coupled to the adjustable core configured to adjust an axial position of the housing relative to the adjustable core in response to adjustment commands.

When the turbocharger is structured in this way, the adjustment mechanism may be spaced further away from the high temperature exhaust gas. As a result, the likelihood of thermal degradation of the adjustment mechanism may be reduced, and more reasonable tolerances can be specified. Therefore, adjustability of the exhaust flow-rate through a turbine scroll is achieved while reducing the likelihood of thermal degradation of the adjustment mechanism, and meeting cost targets.

The above advantages and other advantages, and features of the present description will be readily apparent from the following Detailed Description when taken alone or in connection with the accompanying drawings. For example, while the examples provided herein show axial displacement of the core, rotational displacement (or combinations of axial and rotational displacement) may also be used.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 13 shows a method for controlling a turbocharger.

FIGS. 2-12 are drawn approximately to scale.

DETAILED DESCRIPTION

Embodiments of a turbocharger having an adjustable core are described herein. The adjustable core of the turbocharger is configured to axially adjust with respect to the turbocharger housing, the housing including a compressor volute and a turbine scroll. The adjustable core includes the turbine and compressor rotors, the shaft coupling the turbine and compressor rotors, and other components that are explained in greater detail herein. In one example, movement of the core thus includes movement of the turbine and compressor rotors, the shaft, etc. In this way, the flowrate of fresh air into/out of the compressor and/or exhaust gas into/out of the turbine can be adjusted since the compressor and/or the turbine can communicate to a greater or lesser degree with flow openings in the housing of the compressor volute/turbine scrolls, for example. When the entire adjustable core is adjusted, it will be appreciated that the longevity and robustness of the turbocharger may be increased when compared to other turbochargers using an adjustment mechanism integrated into the housing of the turbine, to adjust the exhaust gas flowrate into the turbine.

Figure 1:
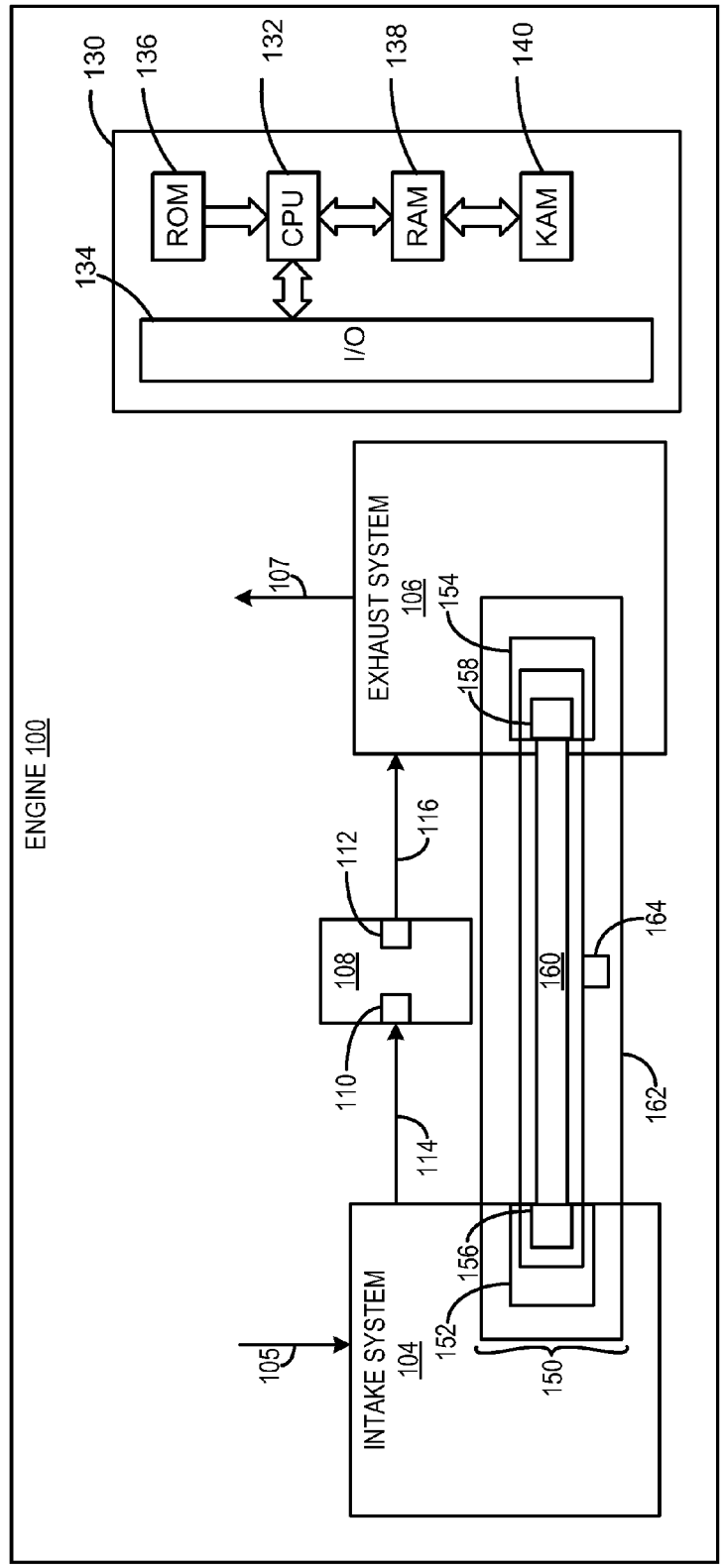
FIG. 1 shows a schematic depiction of a turbocharger.

FIG. 1 shows a schematic depiction of an engine 100 having a turbocharger 150. The engine includes an intake system 104 and an exhaust system 106. The intake system 104 is configured to provide a combustion chamber 108 with intake air and may include components such as a throttle, an intake manifold, etc., to accomplish this functionality. On the other hand the exhaust system 106 is configured to receive exhaust gas from the combustion chamber 108 and may include components such as an exhaust manifold, an emission control device (e.g., catalyst, particulate filter), etc. Arrow 105 represents the flow of intake air into the intake system 104. Likewise, arrow 107 represents the flow of exhaust gas to the surrounding environment from the exhaust system 106.

The combustion chamber 108 may include an intake valve 110 and an exhaust valve 112 coupled thereto. The intake and exhaust valves (110 and 112) may be operated to perform a combustion cycle such as a four stroke combustion cycle (e.g., intake, compression, power, exhaust). Arrow 114 represents the flow of intake air into the combustion chamber 108 from the intake system 104 and arrow 116 represents the flow of exhaust gas from the combustion chamber 108 to the exhaust system 106. Additionally, the engine 100 may further include a fuel delivery system (not shown) configured to supply fuel to the combustion chamber 108 and/or a spark plug configured to initiate combustion in the combustion chamber.

The engine 100 further includes a turbocharger 150 having a compressor 152 and a turbine 154, the compressor having a compressor rotor 156 and the turbine including a turbine rotor 158. The turbine 154 may be driven via exhaust gas flow. Likewise, the compressor 152 may be configured to increase the pressure of the intake air. In this way, the power output and/or the efficiency of the engine 100 is increased.

The turbocharger 150 may further include a shaft 160 rotatably coupling the compressor rotor 156 to the turbine rotor 158. The turbine rotor 158, compressor rotor 156, and the shaft 160 are included in an adjustable core 161. As discussed in greater detail herein, the adjustable core 161 may be an axially adjustable core. A housing 162 circumferentially surrounds at least a portion of the adjustable core 161. In one example, the housing 162 circumferentially encloses the compressor rotor 156, the turbine rotor 158, and the shaft 160.

The turbocharger 150 further includes an adjustment mechanism 164 configured to adjust the axial position of an adjustable core 161 relative to the housing 162. The turbocharger 150 enables the flowrate into the turbine and outflow of the compressor to be controlled based on the operating conditions within the engine. As a result, combustion efficiency and/or power output of the engine is increased.

The engine 100 may further include a controller 130 configured to adjust various components in the engine 100. Specifically, the controller 130 is configured to send adjustment commands to the adjustment mechanism 164 to initiate axial adjustment of the adjustable core 161 relative to the housing 162. Thus the adjustable core 161 may be moved in either axial direction to alter the flowrate of exhaust gas into the turbine 154, discussed in greater detail herein with regard to FIGS. 2-4. The controller 130 may be a conventional microcomputer including: microprocessor unit 132, input/output ports 134, read-only memory 136, random access memory 138, keep alive memory 140, and a conventional data bus.

Figure 2:
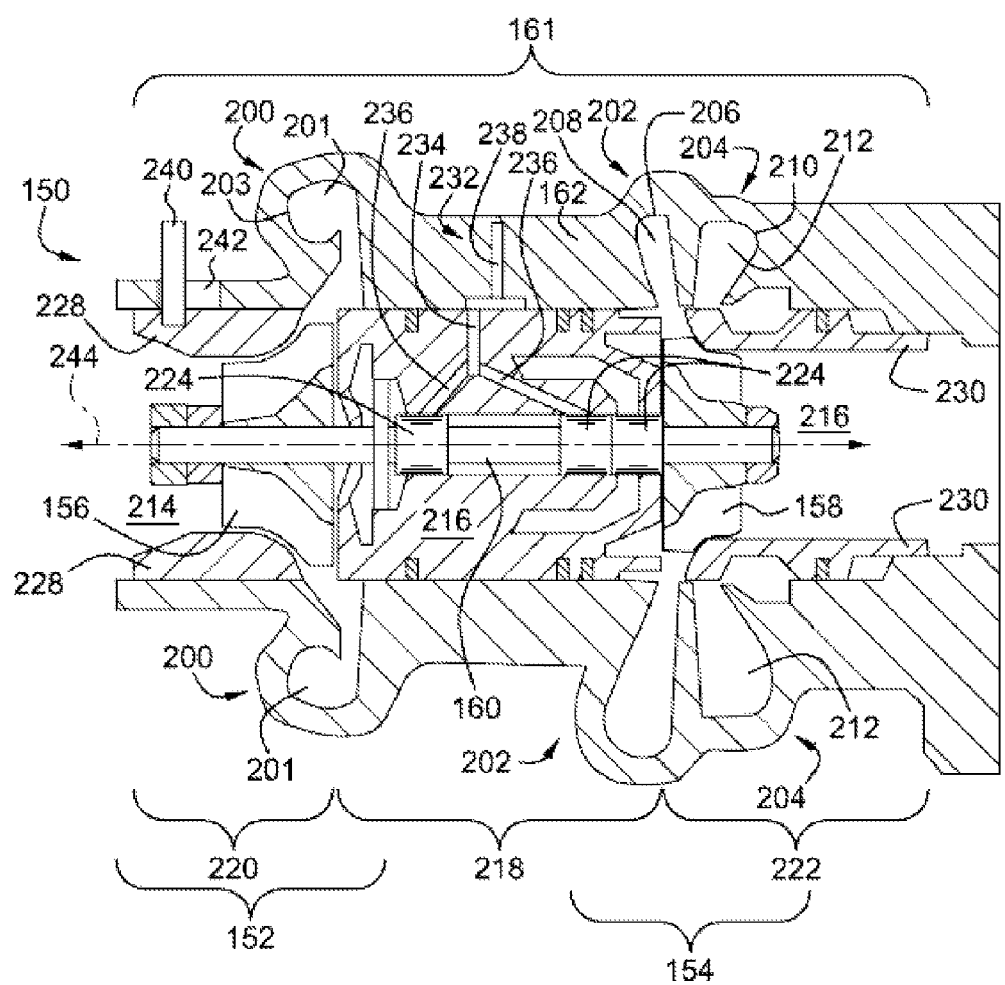
FIG. 2 shows a cross-sectional view of a turbocharger according to an embodiment of the discloser.

FIG. 2 shows an illustration of a cross-section of a first embodiment of the turbocharger 150. As shown, the turbocharger 150 includes the housing 162. The housing 162 includes a compressor volute 200 configured to receive the outflow of the compressor 152. Wall 203 defines the boundary of the compressor volute passage 201.

It will be appreciated that the compressor volute 200 may circumferentially extend around the compressor rotor 156 in a spiral manner.

The housing 162 includes a first turbine scroll 202 and a second turbine scroll 204. The first turbine scroll includes wall 206 defining the boundary of a first turbine scroll passage 208. Likewise, the second turbine scroll includes wall 210 defining a boundary of a second turbine scroll passage 212. It will be appreciated that both of the turbine scroll passage are configured to direct exhaust gas to the turbine rotor 158. Furthermore, the adjustment mechanism 164 may adjust the adjustable core 161 to alter the exhaust gas flow through the first and/or second turbine scroll passages (208 and 212). The first turbine scroll 202 may have different geometric characteristics than the second turbine scroll 204. Specifically, the first turbine scroll 202 may have a geometry configured to increase turbine efficiency at lower engine speeds and the second turbine scroll 204 may have a geometry configured to increase turbine efficiency at higher engine speeds. For example, the first turbine scroll 202 may have a steeper entry angle than the second turbine scroll 204 or visa-versa. The entry angle of the scroll may be defined as the angle between the line of mean flow momentum intersecting the turbine wheel and a line extended from this intersection point tangent to the perimeter of the scroll in a plane perpendicular to the rotational axis of the scroll. However, in other embodiments the housing 162 may include only a single turbine scroll.

During operation of the turbocharger 150, air may flow into the compressor 152 via the compressor inlet passage 214 and flow out to the combustion chamber 108 via the compressor volute 200. Additionally, exhaust from the combustion chamber 108 may enter the turbine 154 via the first and second turbine scrolls (202 and 204) and flow out of the turbine 154 via the turbine outlet passage 216. The outflow of the turbine 154 may be directed to an emission control device and then the surrounding atmosphere in some embodiments.

The turbocharger 150 further includes the adjustable core 161 at least partially enclosed via housing 162. The adjustable core 161 may be divided into several sections including a central core section 218 interposed between a first peripheral core section 220 and a second peripheral core section 222.

The central core section 218 includes the shaft 160, one or more bearings 224 configured to facilitate rotation of the shaft 160, and a shaft housing 226 at least partially enclosing the shaft 160. The central core section 218 axially extends from the turbine rotor 158 to the compressor rotor 156.

The first peripheral core section 220 includes a compressor flow guide 228. The compressor flow guide 228 is configured to direct intake air into the compressor rotor 156 and direct intake air from the compressor rotor 156 to the compressor volute 200. Thus, the compressor flow guide 228 may be fluidically coupled between the compressor rotor 156 and the compressor volute 200. Likewise, the turbine flow guide 230 is configured to direct exhaust gas from the first and second scroll passages (208 and 212) to the turbine rotor 158 and direct exhaust gas from the turbine rotor 158 to the exhaust system 106, shown in FIG. 1. Thus, the turbine flow guide 230 may be fluidically coupled between the turbine rotor 158 and the first and second scroll passages (208 and 212). The turbine flow guide 230 can be axially adjusted to alter the flowrate of exhaust gas into the turbine rotor 158. Likewise, the compressor flow guide 228 can be axially adjusted to alter the flowrate of intake air into the volute passage 201. As discussed in greater detail herein, the first peripheral core section 220 may be coupled to the central core section 218 via a plurality of slotted extension 500, shown in FIG. 5, discussed in greater detail herein. In this way, the relative position of the central core section and the first peripheral core section 220 is substantially fixed. Thus, the axial position of the central core section 218 and the first peripheral core section 220 may be correspondingly adjusted. Likewise, the second peripheral core section 222 may be coupled to the central core section via a plurality of slotted extensions 502, shown in FIG. 5. In this way, the relative position of the central core section 218 and the second peripheral core section 222 is substantially fixed. Therefore, the axial position of the central core section 218, the first peripheral core section 220, and the second peripheral core section 222 may be correspondingly adjusted. In this way, both the geometry (e.g., area) of the flow opening into compressor 152 and the flow openings into turbine 154 may be adjusted based on engine operating conditions to increase the efficiency of the turbocharger 150 through axial movement of the core 161 and specifically the compressor flow guide 228 and the turbine flow guide 230, thereby enabling increased the engine power output and/or efficiency.

The turbocharger 150 also includes a lubrication system 232 including a lubrication passage 234 traversing the central core section 218. Branch passages 236 may be fluidly coupled to the lubrication passage 234 and configured to supply oil or other suitable lubricant to the bearings 224. In this way, wear on the bearings 224 is reduced. The lubrication system 232 further includes a feed passage 238 integrated into the housing 162. It will be appreciated that the feed passage 238 may be coupled to a lubrication circuit including a pump in the engine 100, shown in FIG. 1. In this way, lubricant can be delivered to the feed passage 238.

Figure 3:
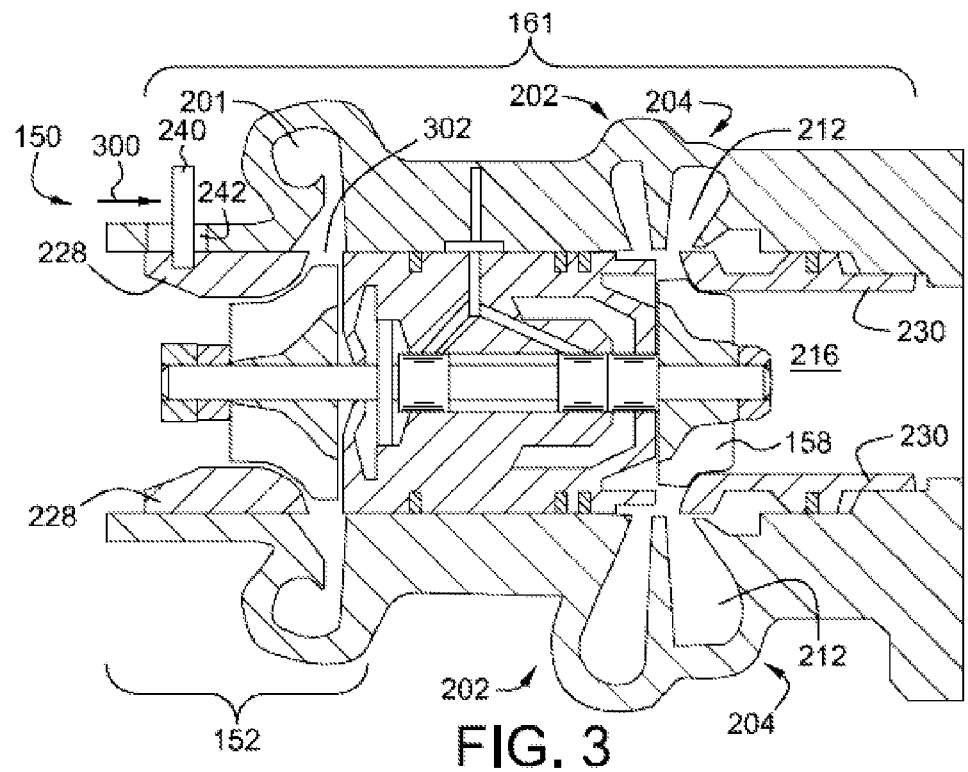
FIGS. 3-4 show the adjustable core in the turbocharger illustrated in FIG. 2 in different axial positions.
Figure 4:
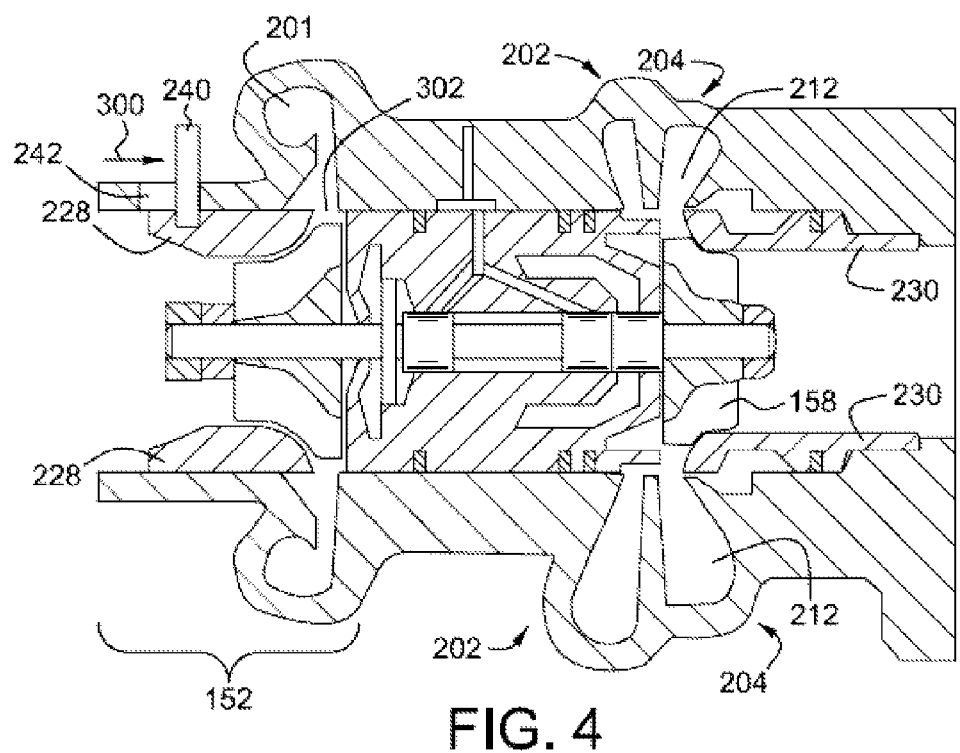

A first embodiment of the adjustment mechanism 164 is shown in FIG. 2. As shown the turbine flow guide 230 is substantially obstructing flow from the second scroll passage 212 to the turbine rotor 158. In this way, exhaust gas flow may be substantially inhibiting from the second scroll passage 212 to the turbine rotor 158. The turbine flow guide 230 may be positioned in this manner when a pressure ratio >1.0 (i.e. boost) is desired but absolute mass air flow is limited, such as for a low speed tip-in. In this way, the effective volume of the turbine is reduced to achieve faster transient response. On the other hand, the compressor flow guide 228 is directing intake air from the compressor rotor 156 to the leading axial edge of the volute passage 201. The adjustment mechanism includes an adjustment post 240 directly coupled to the adjustable core 161 and a track 242 integrated into the housing 162. Specifically, the adjustment post 240 is moveably positioned in the track 242. The track 242 may extend in an axial direct and may be parallel to the axis 244 of rotation of the turbocharger 150. However, the position of the track 242 may be altered in other embodiments. An axial force 300 may be applied to the adjustment post 240 to alter the adjustable core's 161 axial position, as shown in FIGS. 3 and 4. Therefore, FIGS. 3-4 show various axial positions of the turbocharger 150. In this way, the adjustable core 161 is an axially adjustable core. It will be appreciated that the adjustment mechanism 164 may slide the compressor rotor 156 relative to the volute and the turbine rotor 158 relative to the first and second scrolls (202 and 204) concurrently. It will be appreciated that although 3 axial positions are shown in FIGS. 2-4, the turbocharger 150 may be arranged in a large number of positions and specifically in some embodiments the adjustable core may be continuously adjustable. However, in other embodiments the adjustable core may be adjustable in a plurality of discrete positions.

Specifically, FIG. 3 shows a configuration of the turbocharger 150 where the turbine flow guide 230 is partially obstructing flow from the second scroll passage 212 to the turbine rotor 158. Furthermore, the compressor flow guide 228 is positioned in the middle of the outlet 302 of the compressor volute passage 201. It will be appreciated that when the compressor 152 is configured in this way the restriction of the airflow through the compressor is similar for settings as shown in FIG. 3 and FIG. 2. Therefore the boost provided by the turbocharger 150 may be increased when compared to the configuration shown in FIG. 2 because the first scroll passage 208 and a portion of the second scroll passage 212 are capturing the exhaust flow, thereby increasing the speed turbine rotor 158 and therefore the compressor rotor 156. However, it will be appreciated that the configuration shown in FIG. 3 may have a slower transient response than the configuration shown in FIG. 2, due to the increase scroll passage volume through which exhaust gas is traveling in FIG. 3. In this way, the compressor outlet flow and therefore the boost provided by the turbocharger 150 may be adjusted via an adjustable core 161. Likewise, the compressor flow guide 228 directs air flow from the compressor rotor 156 to an outer axial edge of the volute passage 201. In this way, the flow rate and mass flow of the intake air into the compressor rotor 156 is increased, thereby increasing boost provided by the turbocharger 150. It will be appreciated that the turbocharger 150 may be configured in this position when matching the desired boost to the mass flow requirement without venting exhaust energy through the wastegate. For instance, this could be desired when transitioning from light load to mid throttle operation or when transitioning from moderate boost levels to mid boost levels.

FIG. 4 shows a configuration of the turbocharger 150 where the turbine flow guide 230 is not obstructing flow from the first or second scroll (202 and 204) to the turbine rotor 158. In this way, exhaust may be flowed through both scrolls (202 and 204) during turbocharger operation. Therefore, the flowrate of exhaust gas from the scrolls into the turbine rotor 158 is increased, thereby increasing the velocity of the turbine rotor 158 and therefore the compressor rotor 156, when compared to the turbocharger configuration shown in FIGS. 2 and 3. As a result, the boost provided by the turbocharger 150 is increased. Additionally, the compressor flow guide 228 is positioned near the right axial periphery of the outlet 302 of the compressor volute passage 201. When the compressor flow guide 228 is positioned in this way the restriction of the intake air flow through the outlet of the compressor 152 is not substantially different when compared to the configuration shown in FIGS. 2 and 3. However, the increase in exhaust energy capture due to full utilization of both scrolls increases compressor speed, thereby increasing boost provided by turbocharger 150 {. It will be appreciated that the turbocharger 150 may be configured in this position when full flow potential is desired such as at medium load high speed, and high or full load conditions.

Figure 5:
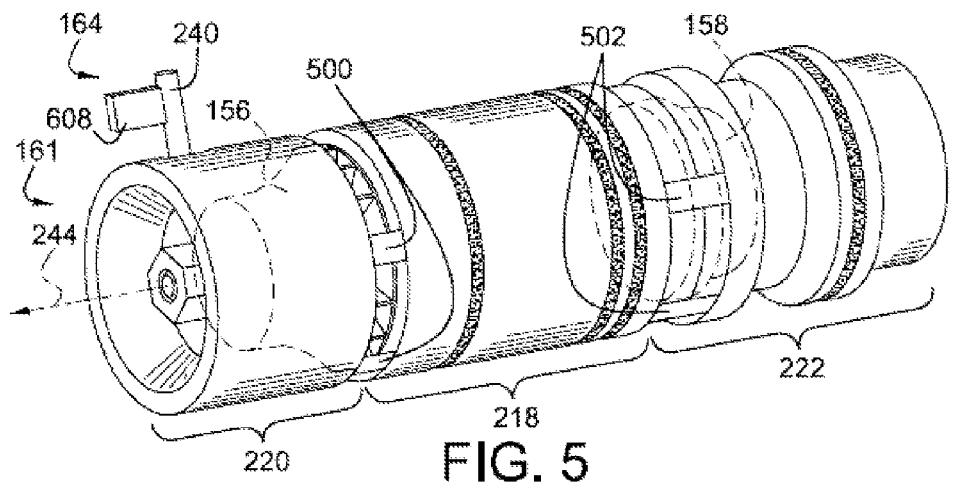
FIGS. 5-8 show several embodiments of the adjustment mechanism included in the turbocharger shown in FIG. 1.
Figure 6:
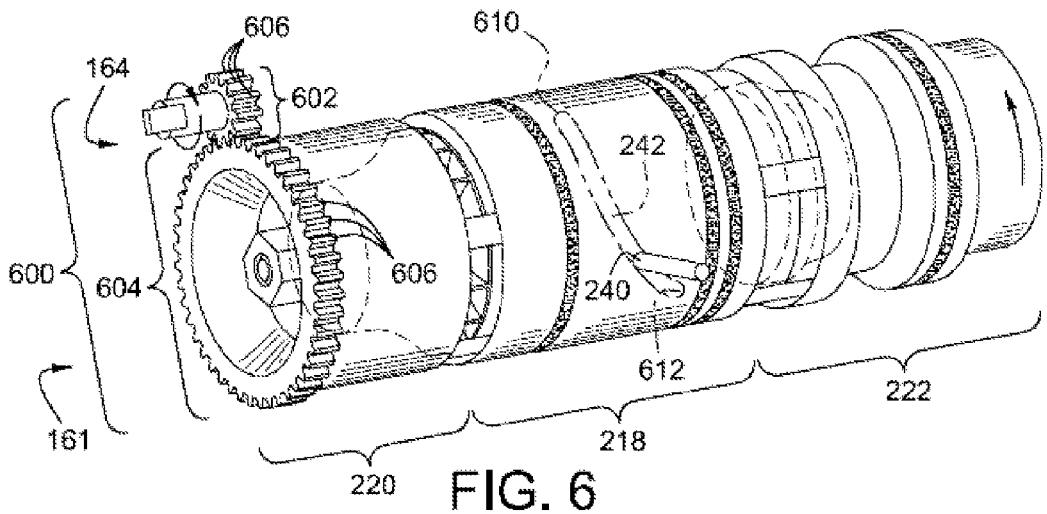
Figure 7:
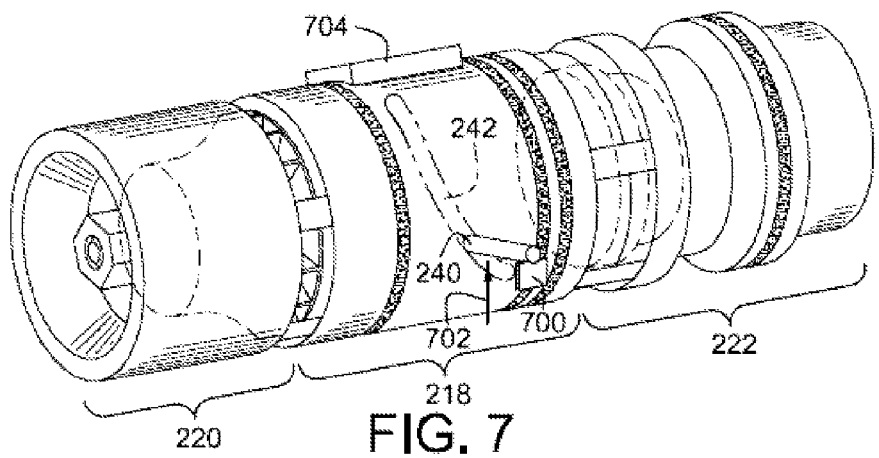
Figure 8:
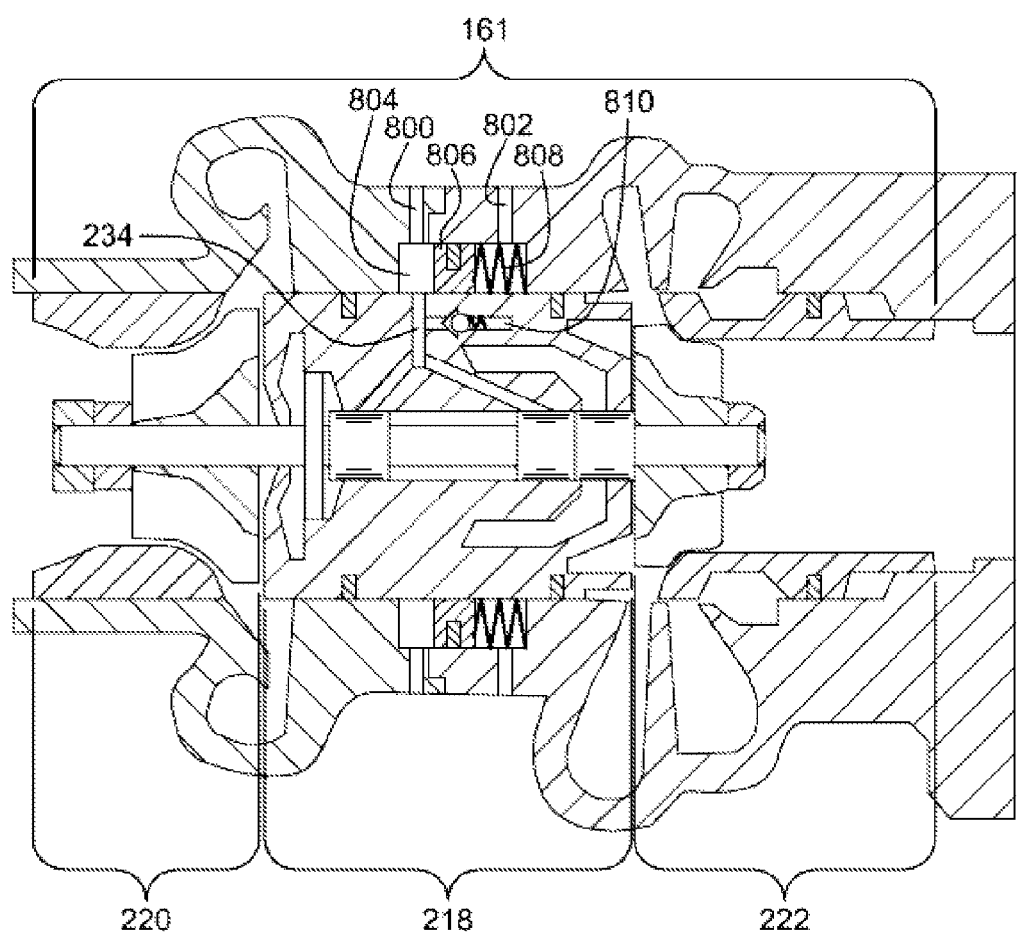

FIG. 5 shows an illustration of the adjustable core 161 and the adjustment mechanism 164 shown in FIGS. 2-4. Furthermore, FIGS. 6-8 show different embodiments of the adjustment mechanism 164 and the adjustable core 161 shown in FIG. 1. It will be appreciated that the controller 130 shown in FIG. 1 may be used to control the various embodiments of the adjustment mechanism shown in FIGS. 5-7.

Specifically, FIG. 5 shows the first embodiment of the adjustment mechanism 164 using axial input to adjust the relative position of the adjustable core 161 and the housing 162. As shown the adjustment post 240 is coupled to the adjustable core 161. Specifically, the adjustment post 240 is coupled to the central core section 218. However, in other embodiments the adjustment post 240 may be coupled to the first or second peripheral core sections (220 and 222). An axial force may be applied to the adjustment post 240 to more the adjustable core 161 in an axial direction. It will be appreciated that the housing 162 may include track 242, shown in FIG. 2, extending in the axial direction to guide the adjustment post 240 in a desired direction. A suitable component, such as a solenoid valve may be used to apply the axial force to the adjustment post 240. In this way, the axial position of the adjustable core 161 may be adjusted based on the operating conditions of the engine. Specifically, the compressor flow guide 228 and the turbine flow guide 230 are axially adjusted responsive to the force applied to the adjustment post 240 and therefore alter the flowrate of the intake air entering the compressor volute 200 from the compressor rotor 156, shown in FIG. 2, and the exhaust gas flowrate from the second turbine scroll 204, shown in FIG. 2, to the turbine rotor 158.

FIG. 5 further illustrates the first peripheral core section 220, the central core section 218, and the second peripheral core section 222 are depicted. The first peripheral core section 220 is fixedly coupled to the central core section 218 via slotted extensions 500. The slotted extensions 500 may extend across a portion of an inlet of the compressor volute 200 shown in FIG. 2. Likewise, the second peripheral core section 222 is fixedly coupled to the central core section 218 via slotted extensions 502. The slotted extensions 502 may extend across a portion of the outlets of the first and second scrolls 202 and 204, shown in FIG. 2. The slotted extensions 500 and 502 are axially aligned with the rotational axis 244 of the turbocharger 150, in the embodiment depicted in FIG. 5. However, in other embodiments the slotted extensions 500 and 502 may be alternately positioned. In this way, the relative positions of the first peripheral core section 220, the central core section, and the second peripheral core section 222 are fixed relative to one another and therefore may simultaneously move in response to an axial force applied thereto. The compressor rotor 156 and the turbine rotor 158 are also shown in FIG. 5. A component schematically depicted at 504 may be configured to apply an axial force to the adjustment post 240 in response to adjustment commands sent from the controller 130 shown in FIG. 1. The component depicted at 504 may be in wired/wireless communication with the controller 130, shown in FIG. 1. In this way, the controller 130 can be used to adjust the axial position of the adjustable core 161 relative to the housing 162.

FIG. 6 shows a second embodiment of the adjustment mechanism 164 shown in FIG. 1. The adjustment mechanism includes the adjustment post 240 and the track 242. However, the track 242 extends in an axial as well as a radial direction in the embodiment depicted in FIG. 6. Therefore, the track 242 includes a first end 610 axially offset from a second end 612. The adjustment post 240 is shown fixedly coupled to the central core section 218 in the depicted embodiment. However, in other embodiments the adjustment post 240 may be coupled to the first or second peripheral core sections (220 and 222). The adjustment mechanism 164 further includes a rotational component 600 including a first gear wheel 602 configured to mesh with a second gear wheel 604 integrated into the adjustable core 161. As shown each of the gear wheels (602 and 604) include gear teeth 606. The second gear wheel 604 is integrated into the first peripheral core section 220. However, in other embodiments the second gear wheel 604 may be integrated into the central core section 218 or the second peripheral core section 222. A component depicted at 608 may be configured to rotate gear wheel 602 in response to adjustment commands sent from the controller 130 shown in FIG. 1. In turn, the second gear wheel 604 rotates and the adjustment post 240 travels axially through track 242. In this way, the controller 130 can be used to adjust the axial position of the adjustable core 161. Specifically, the compressor flow guide 228 and the turbine flow guide 230 are axially adjusted responsive to the rotation of gear wheel 602 via component 608 and therefore alter the flowrate of the intake air entering the compressor volute 200 from the compressor rotor 156, shown in FIG. 2, and the exhaust gas flowrate from the second turbine scroll 204, shown in FIG. 2, to the turbine rotor 158. Furthermore, the component depicted at 608 may be in wired/wireless communication with the controller 130, shown in FIG. 1.

FIG. 7 shows a third embodiment of adjustment mechanism 164, shown in FIG. 1. As shown the adjustment mechanism 164 includes the adjustment post 240 and the track 242, shown in FIG. 6. The track 242 extends in an axial as well as a radial direction. However, in the embodiment depicted in FIG. 7, a component, schematically depicted at 700, is configured to apply a vertical force 702 to the adjustment post 240. When the vertical force is applied to the adjustment post 240, the adjustable core 261 moves in an axial direction. The adjustment mechanism further includes an extension 700 fixedly coupled to the central core section 218. The core guide 704 is configured to guide the movement of the adjustable core 161 during adjustment. The component 700 is may be configured to apply the vertical force 702 in response to adjustment commands from the controller 130 shown in FIG. 1. In response to the vertical force 702 the adjustment post 240 moves vertically as well as axially in the track 242. In this way, the controller 130 can be used to adjust the axial position of the adjustable core 161. Specifically, the compressor flow guide 228 and the turbine flow guide 230 are axially adjusted responsive to the vertical force 702 generated via component 700 and therefore alter the flowrate of the intake air entering the compressor volute 200 from the compressor rotor 156, shown in FIG. 2, and the exhaust gas flowrate from the second turbine scroll 204, shown in FIG. 2, to the turbine rotor 158.

FIG. 8 shows a fourth embodiment of the adjustment mechanism 164 shown in FIG. 1. As show the adjustment mechanism 164 is hydraulic. The adjustment mechanism 164 includes a supply line 800, a return line 802, a chamber 804 partially enclosing a hydraulic piston 806, and a spring 808. The supply line 800 may be configured to increase the oil pressure in chamber 804 to move hydraulic piston 806 in an axial direction. In this way, hydraulic inputs may be used to move the adjustable core 161. The hydraulic piston 806 may be fixedly coupled to the central core section 218. In this way, the central core section 218 can be moved in an axial direction hydraulically. It will be appreciated that the spring 808 provides a return force to the hydraulic piston 806. In this way, the hydraulic piston 806 and the central core section 218 can be returned to its original positioned when the oil pressure in the chamber 804 is decreased. The chamber 804 and/or hydraulic piston 806 may circumferentially extend around the central core section 218. In response to movement of the hydraulic piston 806 generated through a pressure adjustment in the supply line 800 the axial position of the adjustable core 161 is altered. Specifically, the compressor flow guide 228 and the turbine flow guide 230 are axially adjusted responsive to movement of the hydraulic piston 806 and therefore alter the flowrate of the intake air entering the compressor volute 200 from the compressor rotor 156, shown in FIG. 2, and the exhaust gas flowrate from the second turbine scroll 204, shown in FIG. 2, to the turbine rotor 158.

The chamber 804 is fluidly coupled to the lubrication passage 234, in the depicted embodiment. A check valve 810 may be coupled to the lubrication passage 234. The check valve 810 may be configured to open and decrease the pressure in the lubrication passage 234 when the pressure exceeds a predetermined threshold value. However, in other embodiments a separately feed passage may supply oil to the lubrication passage 234.

Figure 9:
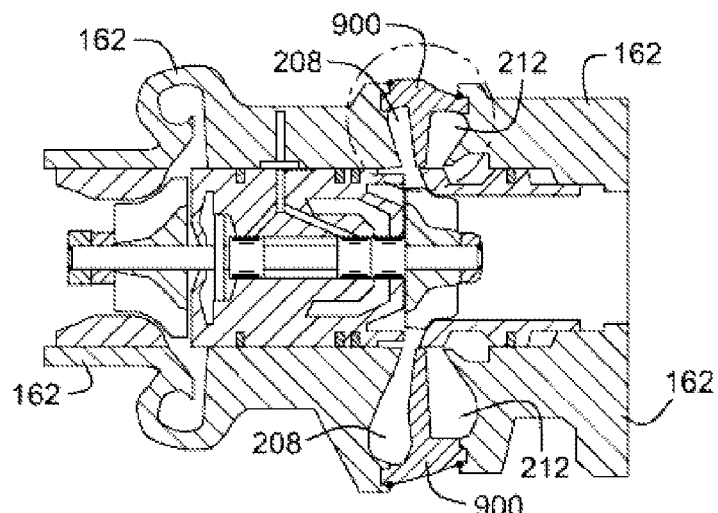
FIGS. 9-12 show various embodiments of the housing of the turbocharger shown in FIG. 1.

FIGS. 9-12 show various embodiments of the housing 162 of the turbocharger 150. In the embodiment shown in FIG. 2 the housing forms a continuous surface and is cast via a single casting. However, in the embodiments shown in FIGS. 9-12 a portion of the housing may be separately constructed (e.g., cast, machined, etc.). Specifically, FIG. 9 shows a divider 900 defining the boundary between the first and second scroll passages (208 and 212) separately manufactured and then coupled to remainder of the housing 162. Thus, the divider 900 may separate the first scroll passage 208 from the second scroll passage 212. It will be appreciated that the housing 162 and the first and the divider 900 may be constructed out of separate materials. For example, the material used to construct the housing 162 may include a high series stainless steel, such as a D5S material. On the other hand, the materials that may be used to construct the divider 900 may include high nickel content stainless alloy such as inconel or an A5N material or Din 1.4848material. It will be appreciated that the material used to construct the divider 900 may be less prone to thermal degradation than the material used to construct the remainder of the housing 162. In this way, the longevity of the turbocharger 150 may be increased when compared to turbochargers using a single material to construct the housing.

Figure 10:
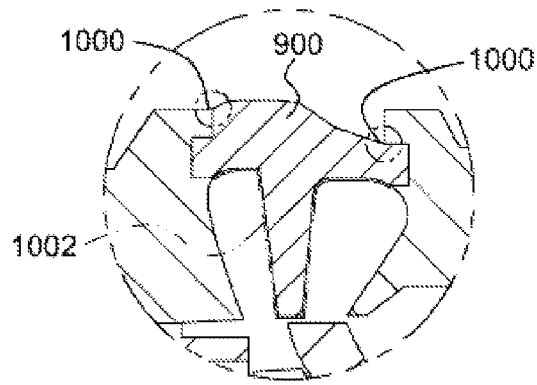
Figure 11:
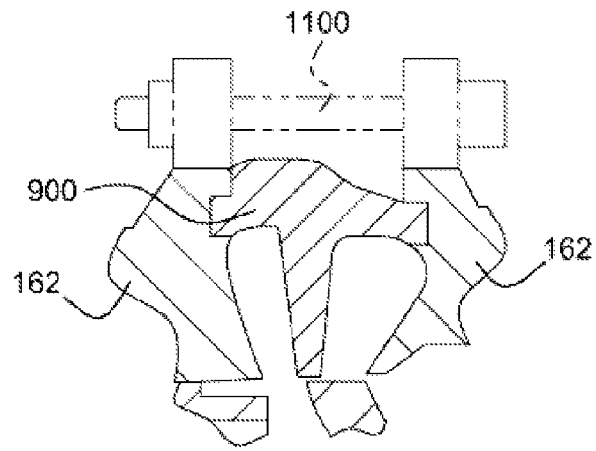

FIG. 10 shows an expanded view of the divider 900 shown in FIG. 9. As shown the section of housing including the first and second scrolls may be welded to the housing 162 via welds such as spot welds 1000. The divider 900 may also include a heat resistant coating 1002. Additionally, FIG. 11 shows the divider 900 coupled to the housing 162 via a bolt 1100. However, in other embodiments it will be appreciated that other suitable coupling techniques may be utilized.

Figure 12:
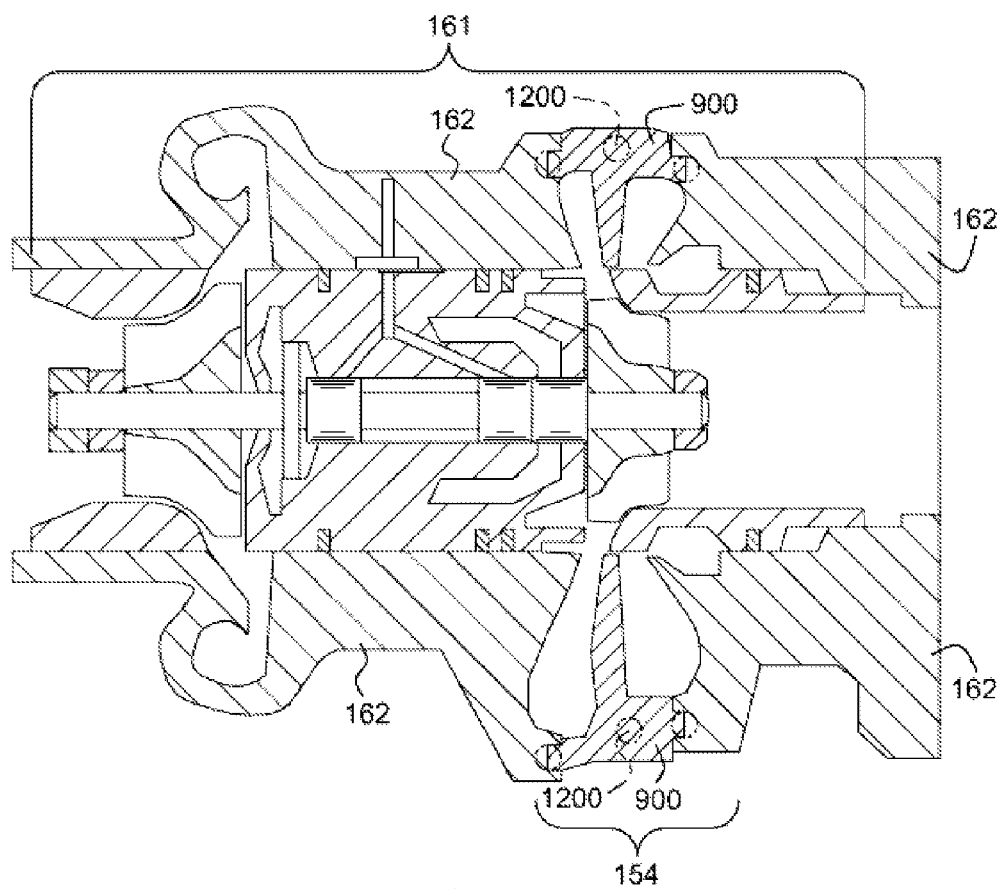

In the embodiment shown in FIG. 12, the divider 900 is shown coupled to the housing 162. A coolant passage 1200 extends through the divider 900. The coolant passage 1200 is configured to circulate coolant through the divider 900 to remove heat from the turbine 154. The coolant passage 1200 may circumferentially extend 360 degrees around the adjustable core 161. The coolant passage 1200 may be coupled to a heat exchanger configured to remove heat from the coolant circulated through the coolant passage.

FIG. 13 shows a method 1300 for controlling a turbocharger. The method 1300 may be implemented via the turbocharger, controller, components, etc., described above with regard to FIGS. 1-12 or may be implemented via another suitable turbocharger, controller, components, etc.

At 1302 the method includes determining if turbocharger adjustment has been requested. If turbocharger adjustment is not requested (NO at 1302) the method ends. However, if turbocharger adjustment is requested (YES at 1302) the method proceeds to 1304. At 1304 the method includes adjusting one or more of compressor outlet flow and turbine inlet flow of the turbocharger via axially sliding a shaft coupling a compressor rotor and a turbine rotor within a fixed housing. The adjusting at 1304 may include at 1306 decreasing or increasing the flowrate of exhaust gas from a turbine scroll to the turbine rotor and at 1308 decreasing or increasing the flowrate of exhaust gas the compressor rotor to the compressor volute.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for a turbocharger comprising:
adjusting an adjustment mechanism of the turbocharger in response to operating conditions of an engine, the turbocharger including a housing and an adjustable core circumferentially surrounded by the housing, the adjustable core axially slideable relative to the housing and including a turbine rotor coupled to a compressor rotor via a shaft, the adjustment mechanism coupled to the adjustable core, the adjustable core sliding the compressor rotor and the turbine rotor concurrently.

2. The method of claim 1, wherein the housing includes a compressor volute and a turbine scroll, the compressor volute configured to receive air from the compressor rotor and the turbine scroll configured to direct exhaust gas into the turbine rotor, wherein the adjustable core slides the compressor rotor relative to the compressor volute and the turbine rotor relative to the turbine scroll concurrently.

3. The method of claim 2, further comprising a second turbine scroll configured to direct exhaust gas to the turbine rotor.

4. The method of claim 3, wherein the first and second turbine scrolls are separated via a divider.

5. The method of claim 4, wherein the divider includes a coolant passage configured to flow coolant therethrough.

6. The method of claim 1, wherein the adjustable core includes an adjustment post extending therefrom.

7. The method of claim 6, wherein the adjustment post is moveably positioned in a track.

8. The method of claim 7, wherein the track circumferentially extends around the adjustable core and includes a first end axially offset from a second end.

9. The method of claim 1, wherein the shaft coupling the turbine rotor and the compressor rotor is axially adjustable.

10. A turbocharger comprising:
a housing;
an axially adjustable core circumferentially surrounded by the housing, the core including a turbine rotor coupled to a compressor rotor via a shaft, a compressor flow guide fluidically coupled between a volute and the compressor rotor, and a turbine flow guide fluidically coupled between a first and a second turbine scroll and the turbine rotor; and
a divider separating the first and second turbine scrolls.

11. The turbocharger of claim 10, wherein the divider includes a coolant passage configured to flow coolant therethrough.

12. The turbocharger of claim 10, further comprising an adjustment mechanism coupled to the axially adjustable core configured to adjust an axial position of the housing relative to the axially adjustable core in response to adjustment commands.

13. The turbocharger of claim 10, wherein the first turbine scroll has a different geometry than the second turbine scroll.

14. The turbocharger of claim 10, wherein the axially adjustable core slides the compressor rotor relative to the volute and the turbine rotor relative to the first and second turbine scrolls concurrently.

15. A turbocharger control method, comprising:
adjusting one or more of compressor outlet flow and turbine inlet flow of a turbocharger via axially sliding a shaft coupling a compressor rotor and a turbine rotor within a fixed housing during turbocharger operation, the turbocharger coupled to an internal combustion engine.

16. The turbocharger control method of claim 15, wherein adjusting one or more of compressor outlet flow and turbine inlet flow includes decreasing or increasing a flowrate of exhaust gas from a turbine scroll to the turbine rotor.

17. The turbocharger control method of claim 15, wherein adjusting one or more of compressor outlet flow and turbine inlet flow includes substantially inhibiting flow of exhaust gas from a turbine scroll to the turbine rotor.

18. The turbocharger control method of claim 15, wherein adjusting one or more of compressor outlet flow and turbine inlet flow is responsive to engine load.

* * * * *